United States Patent [19]
Fox

[11] 3,843,888
[45] Oct. 22, 1974

[54] METHOD AND APPARATUS FOR INSPECTING TIRES

[75] Inventor: Richard L. T. Fox, Cleveland Heights, Ohio

[73] Assignee: Picker Corporation, Cleveland, Ohio

[22] Filed: May 19, 1972

[21] Appl. No.: 254,939

[52] U.S. Cl. ................. 250/360, 250/453, 250/460, 250/491
[51] Int. Cl. .......................................... G01n 23/00
[58] Field of Search ........ 73/146; 250/52, 53, 65 R, 250/83.3 D

[56] References Cited
UNITED STATES PATENTS

| | | | |
|---|---|---|---|
| 3,550,443 | 12/1970 | Sherkin | 73/146 |
| 3,621,246 | 11/1971 | Horsey et al. | 250/52 |
| 3,621,247 | 11/1971 | Lide | 250/52 |

Primary Examiner—William F. Lindquist
Attorney, Agent, or Firm—Watts, Hoffmann, Fisher & Heinke, Co.

[57] ABSTRACT

An x-ray tire inspection system is disclosed which comprises a tire manipulator, an x-ray source for beaming x-rays from bead rim to bead rim through a circumferential section of a tire which is supported and rotated by the manipulator, and an imaging system for producing x-ray transparency images of the tire from bead rim to bead rim. The tire manipulator comprises movable manipulator members disposed at opposite axial sides of the tire for receiving and supporting a tire, moving the tire to an inspection position, shifting the tire position radially relative to the x-ray source and rotating the tire during inspection. After inspection the manipulator members move the tire away from the x-ray source and automatically discharge the tire. The imaging system is constructed for movement about an axis substantially tangent to the circular centerline of the tire torus when the tire is being inspected. The x-ray source focal spot is located within or adjacent the tire torus during inspection.

25 Claims, 16 Drawing Figures

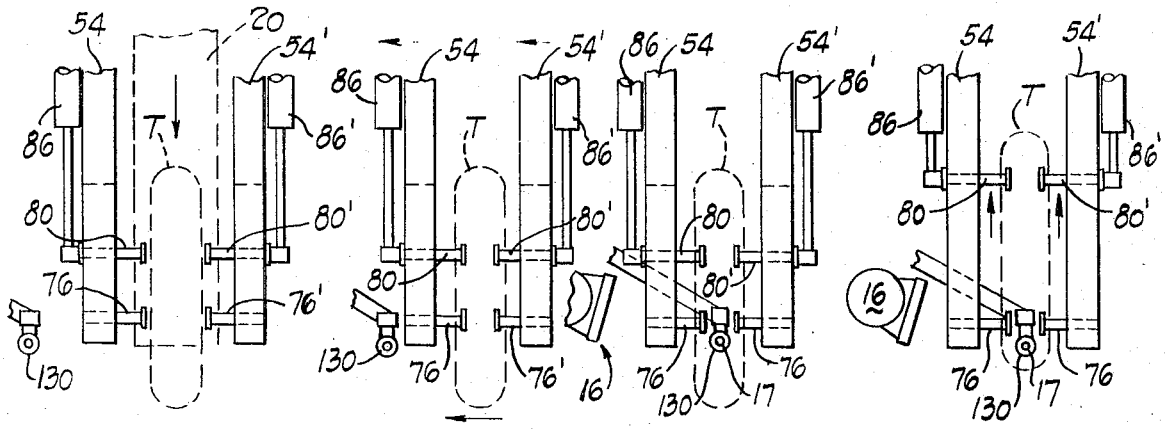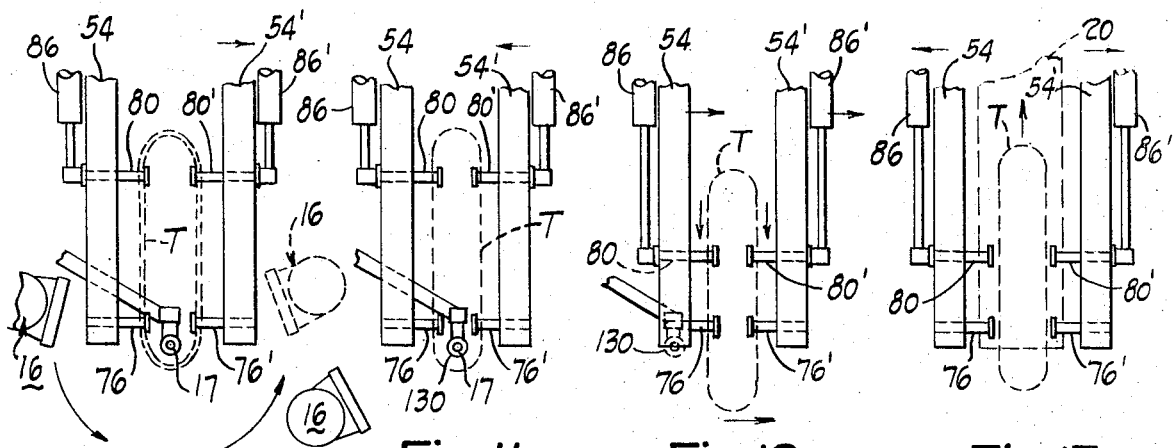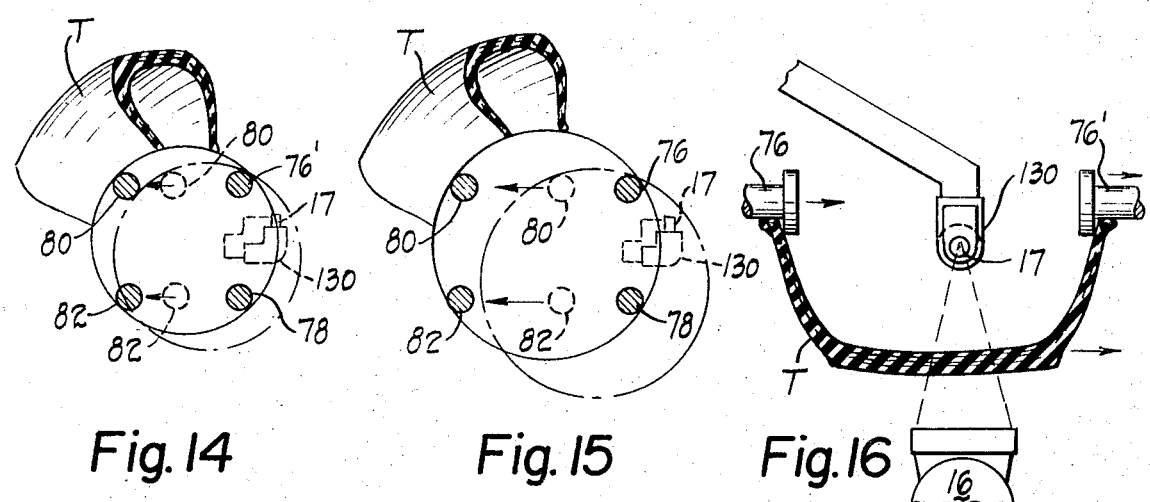

METHOD AND APPARATUS FOR INSPECTING TIRES

CROSS REFERENCED APPLICATIONS

U.S. Patent Application Ser. No. 95,859 filed Dec. 7, 1970 by Anthony Palermo entitled TIRE INSPECTION APPARATUS.

U.S. Pat. Application Ser. No. 301,529 filed Oct. 27, 1972 and entitled METHOD AND APPARATUS FOR INSPECTING TIRES.

BACKGROUND OF THE INVENTION

1. Field of the Invention

The present invention relates to tire inspection and more particularly relates to an improved method and apparatus for x-ray inspection of the internal construction of tires. 2. The Prior Art X-ray tire inspection systems have been proposed in which a tire manipulator supported a tire for rotation about its centerline while an x-ray source positioned within or adjacent the torus defined by the tire directed x-rays through an adjacent circumferential section of the tire from bead rim to bead rim. Such systems sometimes employed imaging units which moved along orbital or arcuate paths about the exterior of the circumferential tire section to produce x-ray transparency images of the internal construction of the tire. These images were viewed by a television camera which transmitted the images to a remote television monitor in an operator's booth.

Some prior art systems were constructed to provide for an x-ray beam which could be swept about an axis through or adjacent the x-ray source under the control of a system operator and/or automatically. The sweeping of the x-ray beam was accomplished in synchronism with movement of the imaging unit. The imaging units have been mounted on support arms which are pivotally movable about an axis defining the center of movement of the imaging unit and have been adjustably shiftable along the support arm radially relative to the pivot axis. Movement of the imaging unit has been controlled by the inspection system operator.

The various components of the systems were controllable from the operator's booth so that the operator visually inspected the internal construction of the tire in the T.V. monitor while controlling the operation of the components of the system to provide images of desired locations of the tire.

In general, the previously proposed tire manipulators defined an axis of tire rotation which was fixed by the geometry of the manipulator so that the location of the tire bead rims and the x-ray source varied relative to the manipulator depending upon the diameter of the tire being inspected. Changes in the tire location and x-ray source location accompanying changes in the size of tires being inspected made it necessary, in many instances, to shift the center of movement of the imaging unit correspondingly. Position adjusting the x-ray source location and the center of movement of the imaging unit was time consuming and significantly increased the complexity of the systems.

It is known that the quality and definition of x-ray transparency images produced by beaming x-rays through a circumferential section of a tire from a focal spot near or within the torus of the tire is improved where the bead rims of the tire are spread apart somewhat. When the bead rims are spread the x-ray beam impinging on the imaging unit passes through the tire wall approximately normal to the tire wall and thus produces an optimum image of the internal structure of the tire. As a consequence, tire manipulators have been constructed with tire supporting shafts which project through the tire hub and support the tire cantilever fashion. These shafts functioned to both drivingly engage and spread the tire bead rims.

The minipulators have frequently included relatively massive support bodies for the support shafts and ram type actuators associated with the shafts for causing the shafts to spread the bead rims. The construction of the manipulator support bodies and shaft actuators was such that the imaging unit travel was limited by interference with these components. As a result, inspection information concerning the tire bead rim and side wall adjacent the manipulator body was obtained by repositioning the x-ray source and/or the imaging unit during inspection of these portions of tires. Moreover, the x-ray transparency images of these portions of the tires were of low quality compared to images obtained from the remaining portions of the same tire because the x-rays being imaged did not pass through the bead rim and adjacent side wall portion normal to the wall of the tire. Furthermore, repositioning of the x-ray source and/or imaging unit was time consuming and frequently required a skilled operator to obtain optimum inspection information.

The cantilevered shaft tire manipulators supported tires for rotation about a fixed axis extending through the center of the tire regardless of the diameter of the tire. In each inspection cycle, therefore, the x-ray source was indexed to an inspection position close to or within the torus of the tire, operated to direct x-rays through the tire wall and then retracted from the inspection position prior to removal of the tire from the support shafts. Movement of the x-ray source between the inspection and retraction positions slowed the inspection cycle and required complicated x-ray source supporting and actuating mechanisms.

When tires were automatically loaded and unloaded from cantilevered shaft-type manipulators, it was necessary to shift the manipulator to a loading and unloading conveyor laterally spaced from the inspection location of the manipulator. As a practical matter, loading and unloading the tires required shifting the manipulators through relatively large distances, for example five or six feet. This was extremely time consuming because manipulator movement was slow.

Since the trends in the tire industry have been toward 100 percent inspection of most types of tires produced, long cycle times of inspection equipment have tended to slow production rates unacceptably. Hence, adjustments of the positions of various components of the inspection systems during each inspection cycle, as well as between inspection runs of different size tires, have been sources of reduced production rates while at the same time requiring the attendance of relatively skilled inspection personnel.

Green, uncured, tires and certain wide tread passenger car tires have also been inspected by systems of the character referred to and when such tires have been inspected a high degree of operator skill has been required. When x-ray images of the generally cylindrical portions of these tires have been required, the operator has had to simultaneously adjust the angulation of the imaging unit support arm, the x-ray beam direction and the radial location of the imaging unit along its support arm. This was a time consuming and tedious process when accomplished manually and, if attempted automatically, required highly complex controls.

SUMMARY OF THE INVENTION

The present invention provides a new and improved method and apparatus for inspecting tires wherein tires are quickly and effectively inspected from bead rim to bead rim by a relatively uncomplicated inspection system. A system constructed according to the invention comprises a tire manipulator comprising manipulator assemblies on opposite sides of a tire which support and rotate the tire with the bead rims spread apart somewhat, an x-ray tube head constructed for positioning within or adjacent the torus of the tire between the manipulator assemblies to direct x-rays through an adjacent circumferential section of the tire from bead rim to bead rim, and an imaging unit movable outside of the torus upon which x-rays from the tube head impinge to produce an x-ray transparency image of the tire construction for inspection purposes.

According to one preferred embodiment of the invention, the x-ray tube head is constructed to produce a conical beam of x-rays emanating from a focal spot defined by the tube head. The beam of x-rays can be swept about an axis extending through the focal spot so that the x-ray beam can be directed as desired about the focal spot and through the tire.

The imaging unit is supported for movement about a center of movement, or axis of rotation, which extends generally tangentially to the centerline of the torus defined by the tire and comprises an x-ray detector member which is radially movable relative to the position of the axis of rotation of the imaging unit. The imaging unit in the preferred embodiment of the invention produces a video T.V. output signal which is transmitted to a T.V. monitor at an operator station.

Also located at the operator's station are controls for governing the angulation of the x-ray beam relative to the x-ray tube head, the position of the imaging unit about its axis of rotation, the positioning of the x-ray detecting member radially relative to the axis of rotation of the imaging unit, and controls governing operation of the tire manipulator and a conveyor system for loading and unloading tires.

Constructional features of the new inspection system eliminate radial adjustment of the x-ray tube head with respect to the tire bead rims during each inspection cycle; eliminate radial repositioning of the x-ray tube head for inspecting tires having different diameters; eliminate repositioning the image unit center of motion, or axis, to accommodate tires of different diameters; substantially simplify inspection of green tires and cured wide-tread tires which have wide generally cylindrical tread regions; permit optimum imaging of the bead rims and adjacent side wall portions of each tire inspected by obviating interference between the imaging unit and the manipulator; and minimize the time required to load and unload the tires from the manipulator.

An important feature of the invention resides in the construction of the tire manipulator which includes a pair of manipulator assemblies each comprising a support member disposed on an axial side of a tire being inspected. Each support member includes stub shafts which project into the tire hub and engage the adjacent bead rim of the tire for supporting the tire.

The x-ray tube head and manipulator assemblies are relatively movable in a direction parallel to the tire centerline so that the x-ray tube head is insertable between the manipulator assemblies function to shift the tire relative to the x-ray tube head so that the x-ray tube head is shifted radially relative to the tire and is located adjacent or within the torus defined by the tire during actual inspection. The tire is then rotated about its centerline for inspection. The x-ray tube head is supported and restrained against movement in a direction transverse to the tire centerline during the inspection cycle.

The amount of shifting of the tire radially relative to the x-ray tube head depends upon the bead rim diameter of the particular tire being inspected and no radial positioning of the x-ray tube head relative to the manipulator assemblies is required to accommodate different diameter tires.

When a tire is shifted to the tire inspection position by the manipulator assemblies, the circular centerline of the torus defined by the tire also shifts to a position at which the axis about which the imaging unit moves extends approximately tangentially to the torus centerline. This relationship between the torus centerline, and the imaging unit axis, or center of movement, is nearly the same throughout the range of tire sizes which the manipulator is capable of handling. For this reason the imaging unit need not be position adjusted, i.e. its axis need not be shifted, when the size of the tire being inspected is different from that of preceding tires.

Another important feature of the tire manipulator resides in the ability of the manipulator assemblies to move relatively toward and away from each other. This enables the tire bead rims to be spread apart by moving the manipulator assemblies relatively away from each other when a tire is supported by and between the assemblies. Furthermore, because the manipulators move relatively toward and away from each other, loading and unloading of the tires can be accomplished quickly and without requiring substantial movement of either manipulator assembly in order to engage or disengage the tire.

The manipulator assemblies are also movable together, or simultaneously, to transport the supported tire between a loading or unloading station and the inspection station of the apparatus. This mode of movement of the manipulator assemblies also permits simplified manipulation of green tires and cured wide tread tires during x-ray inspection. Inspection of the generally cylindrical portions of such tires is accomplished merely by aligning the x-ray beam and the imaging unit and then moving the manipulator assemblies simultaneously to move the tire parallel to its centerline between the x-ray tube head and the imaging unit while rotating the tire. No compensating position adjustments to the x-ray tube head or the imaging unit are required during such inspection.

The manipulator assemblies are constructed and arranged so that the imaging unit can move about the tire without interference with the manipulator assemblies when the tire bead rims or adjacent side wall portions are being x-rayed. These portions of the tires can thus be inspected by imaging x-rays which pass through and normal to the bead rims and adjacent side wall portions.

At the beginning of an inspection cycle when a tire is to be loaded, the manipulator assemblies are moved together to a position where the space between them is aligned with the tire conveyor. The manipulator assemblies are moved relatively apart to provide clearance for the tire to be fed into position between them.

When the tire is positioned between the manipulator assemblies, the assemblies move relatively toward each other so that the tire is supported between the assemblies by stub shafts which engage the tire bead rims. The assemblies are then simultaneously moved in a direction parallel to the centerline of the tire to transport the tire to the inspection position and relative to the x-ray source. During this movement of the manipulator assemblies the x-ray tube head is inserted through an access opening in one manipulator assembly to a location between the assemblies within the tire bead rim diameter.

The manipulator assemblies then shift the tire in a direction transverse to its centerline relative to the x-ray tube head so that the tube head is disposed within or adjacent the torus of the tire.

The manipulator assemblies are then moved relatively away from each other somewhat so that the tire bead rims are spread apart.

After inspection has been completed the manipulators move relatively towards each other to return the bead rims to their unspread positions, shift the tire relative to the tube head so that the x-ray tube head is disposed within the bead rims of the tire and then transport the tire to the unloading station from the inspection station.

At the unloading station the tire is engaged and supported by a conveyor and the manipulator assemblies are moved relatively away from each other to provide clearance for the tire to be removed from the inspection apparatus by the conveyor. The inspection cycle is then repeated.

Other features and advantages of the invention will become apparent from the following detailed description of a preferred embodiment which is made with reference to the accompanying drawings.

BRIEF DESCRIPTION OF THE DRAWINGS

FIGS. 6-13 are schematic top plan views of parts of the system of FIG. 1 and illustrate a series of stages in a cycle of operation of the system.

FIG. 14 schematically illustrates the manner in which a tire supported by the manipulator assemblies is shifted relative to an x-ray tube head for inspection;

FIG. 15 is a schematic view similar to FIG. 14 showing shifting of a larger diameter tire relative to the x-ray tube head; and, FIG. 16 is a fragmentary cross sectional view illustrating the inspection of a wide tread type tire according to the invention.

DESCRIPTION OF A PREFERRED EMBODIMENT

Figure 1:
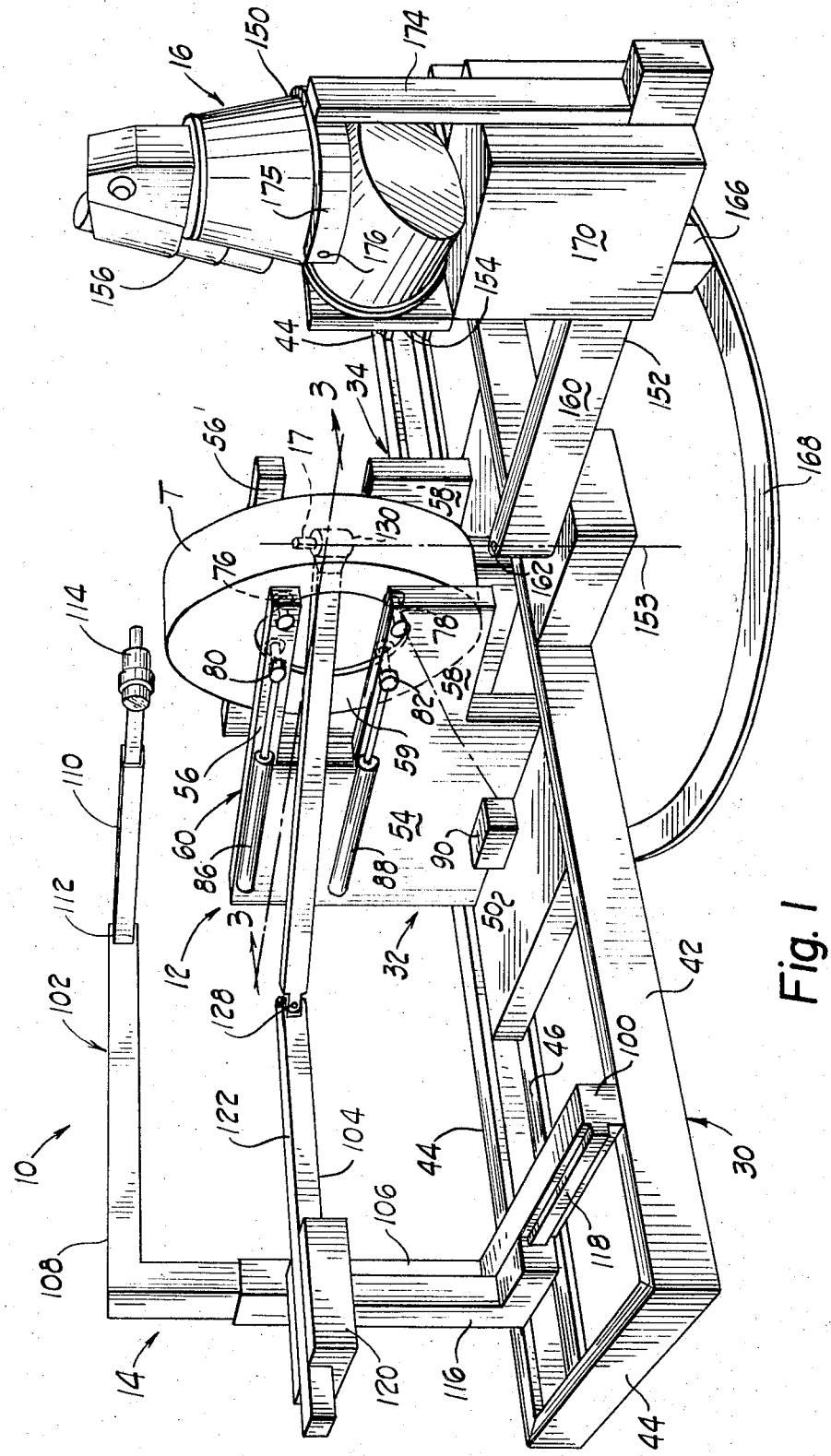
FIG. 1 is a perspective view of a tire inspection system embodying the present invention.

A tire inspection system 10 constructed according to a preferred embodiment of the present invention is illustrated in FIG. 1 of the drawings. The system 10 comprises a tire manipulator system 12 for supporting and manipulating a tire T, an x-ray source assembly designated at 14 which is positioned to direct x-rays through the tire T, and an x-ray imaging system 16 upon which x-rays which have passed through the tire T impinge and which is constructed to produce an x-ray transparency image of the internal construction of the tire T.

Briefly and in general, the operation of the system 10 provides for bead rim to bead rim x-ray inspection of the tire T and this inspection is accomplished by directing x-rays through the wall of the tire T from a focal spot 17 defined by the source assembly 14 within or adjacent the torus defined by the tire T. X-rays are directed from the focal spot 17 through the tire T from bead rim to bead rim and the imaging system 16 is orbitally movable about the focal spot 17 and a circumferential section of the torus of the tire T so that x-ray transparency images of the x-rays which have passed through the tire from the focal spot can be produced. The manipulator system 12 rotates the tire generally about its centerline or axis as x-rays are directed through the tire so that x-ray transparency images of the complete tire can be obtained.

In the preferred embodiment the system 10 may be located on the floor of a tire production plant and enclosed in a suitable booth, not shown, which shields the surrounding environment from the x-rays produced by the x-ray source assembly 14. A system operator's station is located outside of the booth and is equipped with controls by which operation of the system 10 is governed. The operator's station is also provided with a television monitor on which x-ray transparency images created by the imaging system 16 are reproduced so that the operator can visually inspect the internal construction of the tire T as it is being x-rayed.

Figure 2:
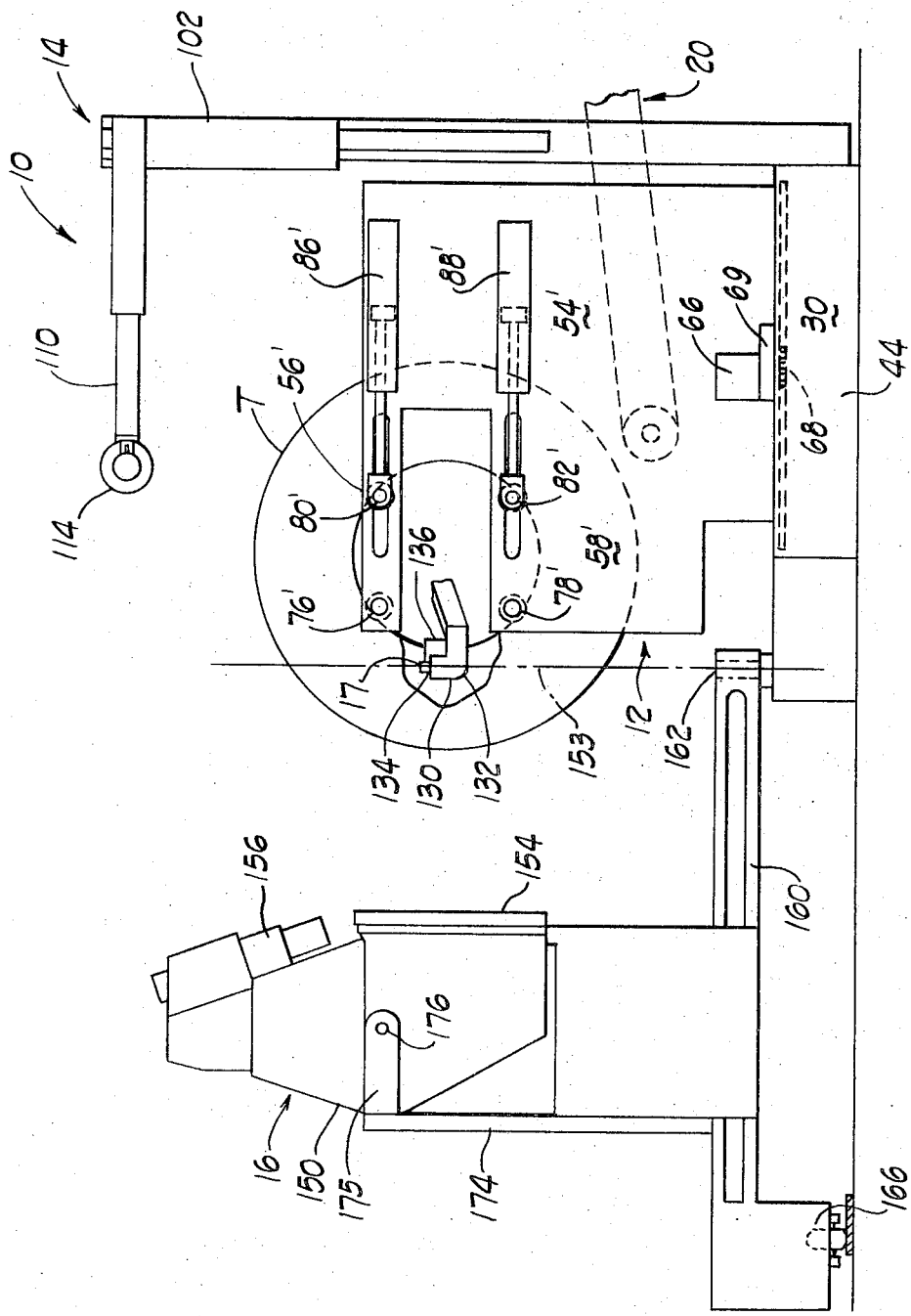
FIG. 2 is a side elevational view of the system illustrated in FIG. 1.
Figure 3:
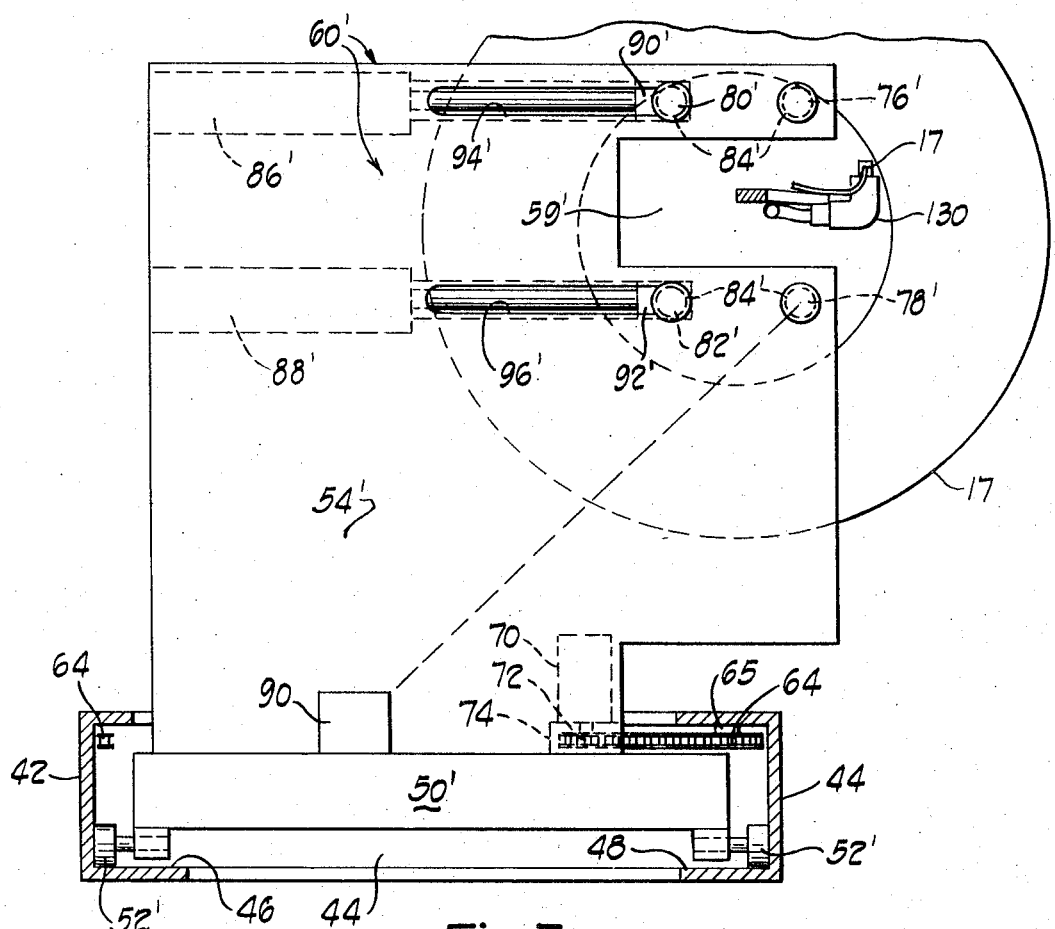
FIG. 3 is a cross sectional view seen generally from the plane indicated by the line 3—3 of FIG. 1 with parts removed.

In the illustrated and preferred embodiment of the invention tires are delivered to and removed from the system 10 at a loading or unloading station by a tire conveyor system 20 (schematically illustrated, see FIG. 2). The conveyor system 20 can be of any suitable or conventional construction and therefore is not illustrated or described in detail. Such conveyor systems can comprise a ramp or chute-type tire conveyor or an overhead trolley conveyor. A single conveyor 20 is illustrated for loading and unloading tires, however, a separate loading and unloading conveyor can be associated with the system 10 if desired.

The Tire Manipulator System 12

The tire manipulator system 12 receives tires one at a time from the conveyor system 20, transports the tires to the inspection station (illustrated in FIGS. 1-5), manipulates the tire for and during the inspection and thereafter transports the inspected tire back to the conveyor system 20 for unloading.

The tire manipulator system 12 comprises an elongated supporting base 30 upon which the tire manipulator assemblies 32, 34 are movably supported. The assemblies 32, 34 extend along axial sides of the tire T to support the tire T between them. A drive unit 36 (FIG. 5) is associated between the base 30 and the assemblies 32, 34 for moving the assemblies 32, 34 along the base so that the assemblies can transport a tire between them relative to the base. The drive unit 36 is also effective to move the assemblies 32, 34 relatively toward and away from each other in a manner described presently.

In order to load the tire T into the system 15 the assemblies 32, 34 are moved to a tire loading station which is defined by the intersection of the line of movement of the tire along the conveyor system 20 and the base 30. The assemblies 32, 34 are moved apart from each other and the tire is fed from the conveyor to a position between the manipulator assemblies at the loading station. The manipulator assemblies are then moved relatively toward each other to engage and support the tire between them. The manipulator assemblies are then moved simultaneously to transport the tire T to the inspection station of the system 10 at which position the manipulator assemblies are illustrated in FIGS. 1–5. Further manipulation of the tire T occurs at the inspection station and is described presently.

After inspection the drive unit 36 moves the assemblies 32, 34 back to the loading station at which point the conveyor system 20 engages and supports the tire T and the assemblies 32, 34 are moved away from each other to enable the tire T to be withdrawn from the system 10. A succeeding tire is then loaded into the assemblies 32, 34 and the cycle repeated.

When the conveyor assembly 20 is a ramp or chute type conveyor, it is constructed so that a ramp or chute portion can move to the loading and unloading station from a retracted position behind the manipulator assemblies. Thus the conveyor does not interfere with movement of the assemblies as they transport tires to or from the loading or unloading station.

The base 30 is defined by a rectangular framework comprising front and rear side frames 40, 42 defined by structural channel members and end frames 44 connected between opposite ends of the side frames 40, 42. The flanges of the side frames extend inwardly of the base to define ways 46, 48 along which the assemblies 32, 34 move.

The manipulator assemblies 32, 34 are in most respects identical mirror images of each other and to the extent that these assemblies are identical, like parts are indicated by corresponding primed reference characters. In the interest of brevity only the assembly 32 is described and instances where the assemblies 32, 34 differ are pointed out.

The assembly 32 comprises a carriage 50 supported on the ways 46, 48 by four wheels 52 which roll along the ways as the carriage moves, and an upstanding plate-like support member 54 fixed to the carriage 50 near one end. The support member 54 includes cantilevered arms 56, 58 which are spaced vertically apart and project forwardly above and beyond the front side frame 42. An access opening or recess 59 is defined between the arms 56, 58. A tire engaging and manipulating mechanism 60 is associated with the arms of the support members 54 and by which the bead rim of the tire is engaged, partially supported, and manipulated for inspection. The mechanism 60 is described in greater detail presently.

Figure 5:
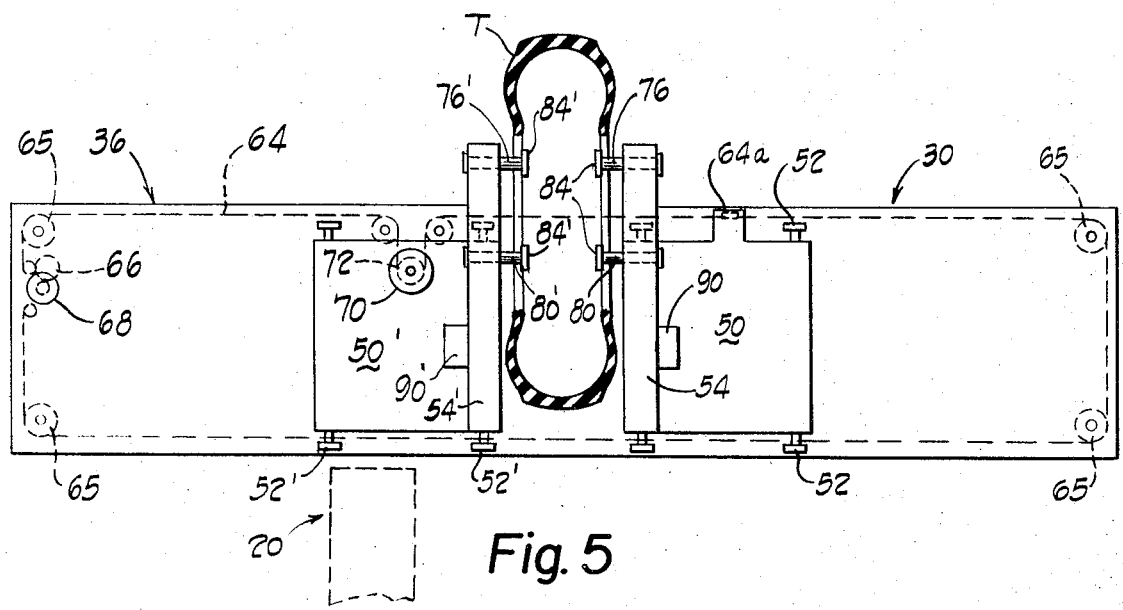
FIG. 5 is a schematic top plan view of a portion of the system shown in FIG. 1.
Figure 4:
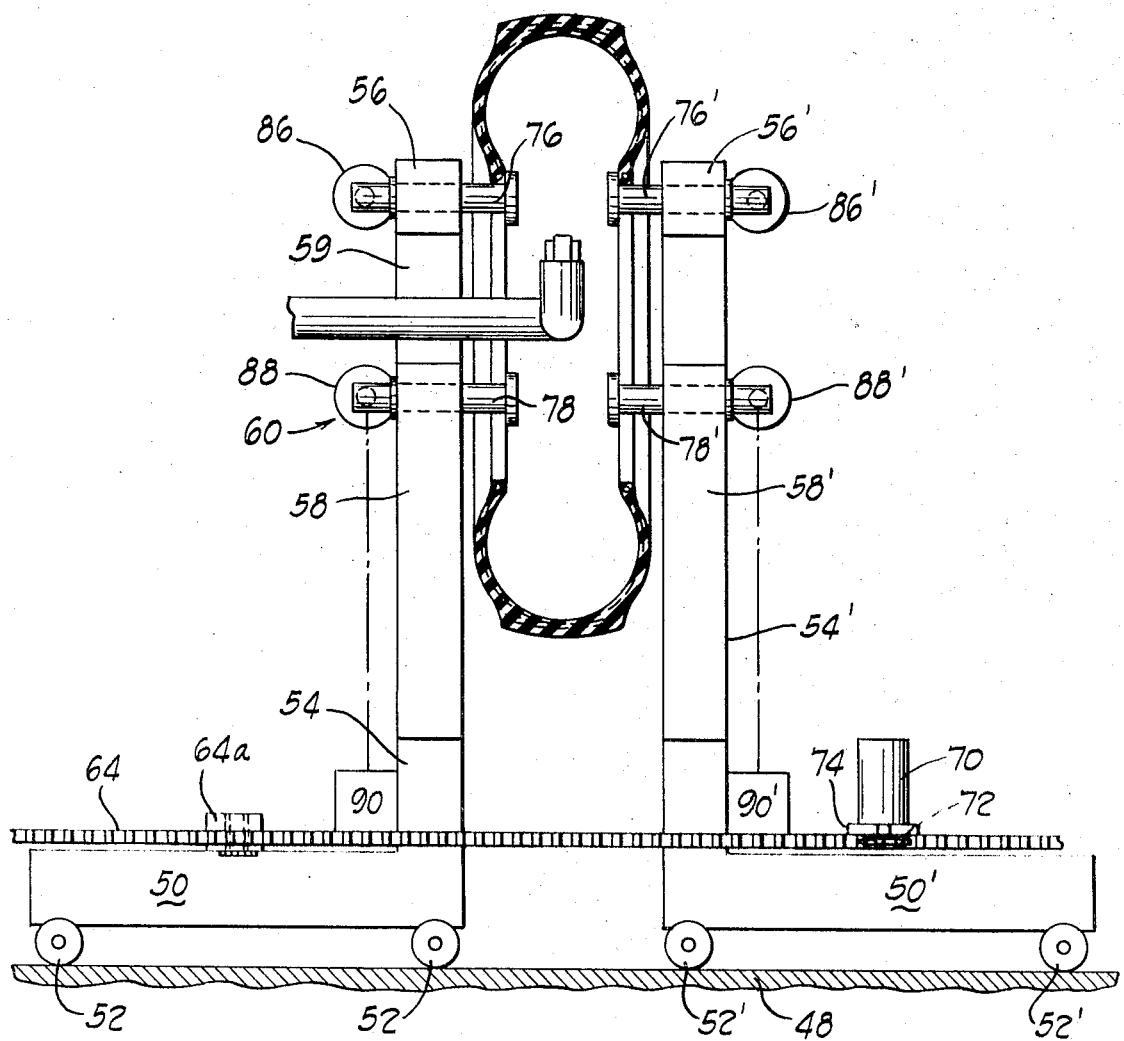
FIG. 4 is a front elevational view of a portion of the system shown in FIG. 1 with parts broken away and portions shown in cross section.

The preferred manipulator drive unit 36 for moving the assemblies 32, 34 simultaneously, or together, along the base 30 and relatively toward and away from each other is schematically illustrated in FIG. 5. In the preferred embodiment the drive unit comprises a chain 64 which is trained about the interior of the base 30 by suitable idler sprockets 65 rotatably supported on the frame at spaced locations. A reversible chain drive motor 66 is supported at one end of the base 30 and is operated to drive the chain 64 by way of a drive sprocket 68 and transmission drive 69 (see FIG. 2). The carriage 50 is fixed to the chain 64 by a suitable cleat 64a so that as the chain is driven the manipulator assembly 32 moves with it relative to the base 30 in either direction depending on the direction of movement of the chain.

The carriage 50' carries a reversible drive motor 70 coupled to a drive sprocket 72 via a transmission 74. The chain is trained about the drive sprocket 72. When the motor 70 is energized, the manipulator assembly 34 moves along the base 30 and toward or away from the manipulator assembly 32 depending upon the direction of operation of the motor 70. The transmission 74 includes a suitable brake to prevent the sprocket 72 from rotating when the motor 70 is deenergized and the train is driven by the motor 66. Hence, the assembly 34 is, for practical purposes, fixed to the chain 64 except when the motor 70 is operated.

The drive transmission 69 coupled to the motor 66 and drive sprocket 68 also includes a suitable brake so that the chain 64 cannot turn the sprocket 68 when the motor 66 is deenergized and the motor 70 is operating. The motors 66, 70 are preferably reversible electric motors whose operation is controlled from the operator's station.

The mechanism 60 is effective to shift the tire in a direction transverse to its centerline relative to the base 30, rotate the tire T about its centerline during its inspection, and to aid in spreading the bead rims axially apart. The mechanism 60 comprises a pair of vertically spaced rotatable stub shafts 76, 78 supported by the arms 56, 58, respectively, and a pair of vertically aligned rotatable stub shafts 80, 82 slidably supported by the arms 56, 58, respectively, for horizontal movement relative to the shafts 76, 78. The stub shafts project from the assembly 32 toward the assembly 34 for engagement with the bead rim of the tire supported between the assemblies and each shaft has an annular flange 84 at its projecting end which is constructed to extend inside the tire T and radially along the inside of the bead rim and an adjacent tire side wall portion to prevent the tire from working off of the stub shafts and to enable bead rim spreading forces to be applied to the tire.

The stub shafts 80, 82 are movable toward and away from the shafts 76, 78 by operation of rams 86, 88, respectively. The rams 86, 88 are preferably double acting pneumatic rams having their cylinders fixed to the support member 54 and their piston rods connected to the respective stub shafts 80, 82 for sliding the stub shafts relative to the support member. In the illustrated embodiment the stub shafts 80, 82 are rotatably supported by guide blocks 90, 92 which in turn are mounted for sliding movement in slot-like ways 94, 96 formed in the support member 54. The rams 86, 88 are mounted on the opposite sides of the support member from the projecting shafts.

When the rams 86, 88 are fully extended, the stub shafts are in their tire receiving and transporting positions, i.e. the horizontal distance between the axes of the shafts 76, 78 and 80, 82, respectively, is minimum. The shafts all extend within the tire bead rim diameter of the smallest tire which the system 10 will accommodate with ample clearance so that such a tire is loosely supported solely by the stub shafts 76, 80, 76', 80' of each of the manipulator assemblies 32, 34. The tire receiving and transporting position of the stub shafts is illustrated in FIG. 14 with the shaft 80' shown in broken alternate position lines.

When a tire has been transported to the inspection station, the rams 86, 88 are simultaneously operated to retract the piston rods and to move the stub shafts 80, 82 away from the shafts 76, 78. This movement raises the centerline of the tire T slightly and, more importantly, shifts the tire centerline laterally towards the rams. The rams retract the shafts 80, 82, until the tension in the bead rim stalls the rams at a position in which all four stub shafts of each of the manipulator assemblies tightly engage the bead rim. (see FIG. 14)

At this juncture, or simultaneously with operation of the rams, the assembly 34 is shifted away from the assembly 32 to spread the bead rims apart.

In the illustrated embodiment, the tire T is rotatable for inspection by operation of a motor 90 drivingly connected to the stub shaft 78 via a suitable drive transmission such as a driving chain. The motor 90 is preferably supported on the carriage 50. As the stub shaft 78 is driven, the tire T rotates and the remaining stub shafts freely rotate so that rotation of the tire is unimpeded by them. Additional stub shafts can be driven to aid in rotating the tire T, if desired.

The operation of the manipulating mechanism 60 is the same as described for a tire having the largest bead rim diameter for which the system is designed. FIG. 15 of the drawings illustrates operation of the mechanism 60 with a large diameter tire supported by the assemblies 32, 34. A typical range of bead rim diameters for which a system of the type disclosed might be designed is, for example, 14 to 24 inches. It is important to note that although the centerlines of the larger diameter tires are shifted laterally farther than the centerlines of relatively smaller tires, the circular centerlines of the toruses defined by the tires are shifted so that vertical lines tangent to the torus centerlines of all size tires are located quite close together just beyond the projecting ends of the arms 56, 58.

The Source Assembly 14

The source assembly 14 comprises a support frame 100 which is fixed to the base 30 and two x-ray tube head supporting assemblies 102, 104 which are connected to the frame. The x-ray tube head support assembly 102 is constructed to emit beaming of x-rays through the tire tread region of a tire T generally tangential to the tire tread region for "over the horizon" x-ray inspection. The x-ray tube head support assembly 104 is constructed to enable the beaming of x-rays through a circumferential section of the tire T from the focal spot 17 from which or adjacent the torus defined by a tire to enable bead rim to bead rim x-ray inspection of the tire.

The assembly 102 comprises a tubular vertical support member 106 fixed to the frame 100, an L-shaped arm 108 telescopically received by the vertical support 106 and extending horizontally from the support member 106 towards the inspection station, and an extensible span 110 which is connected to the arm 108 by a hinge 112. A straight x-ray tube 114 is connected to the end of the extensible span 110 for beaming x-rays tangentially through the tread region of the tire. The location of the x-ray tube 114 is adjustable vertically and horizontally as desired to cover a wide range of tire sizes and shapes.

The assembly 104 comprises an L-shaped arm 116 having a horizontal leg portion connected to a way 118 defined by the support frame 100. A vertical leg of the arm 116 supports a guide 120 for a support arm 122. The support arm 122 extends horizontally from the arm 116 and is adjustably movable horizontally relative to the guide 120. A hinge 128 is formed about midway along the support arm 122 to enable angular adjustment of the projecting end of the support arm 122 relative to the arm portion supported by the guide 120.

An x-ray tube head assembly 130 is supported by the projecting end of the arm 122. The assembly 130 comprises an L-shaped or right angle x-ray tube housing 132 having an x-ray tube 134 rotatably mounted within it. The x-ray tube 134 provides the focal spot 17 at its target electrode from which an x-ray beam emanates in a conical envelope. A drive motor and transmission 136 form part of the housing 132 and are effective to rotate the x-ray tube 134 relative to the housing so that the x-ray beam is swept about the focal spot 17 through the tire wall from bead rim to bead rim.

High tension cables, water coolant hoses and the motor energizing conductors have not been illustrated in the drawings, but such conductors and conduits extend to the x-ray tube head assembly 130 along the support arm 122. Various controls for operation of the x-ray tube head assembly 130 are located at the operator's station and are not illustrated.

The x-ray tube can be of any suitable construction, for example, a 360° throw tube with or without a rotating collimator could be employed. Other types of suitable x-ray tube constructions can also be employed without departing from the invention. An x-ray tube head assembly substantially the same as the tube head 130 is illustrated and described in the cross referenced application to Palermo and reference should be made to the application for a more detailed description of the assembly 130.

The guide 102 and support arm 122 are vertically spaced from the base 30 and are at a level coinciding with the elevation of the access opening 59 from the base. The x-ray tube head 130 thus is capable of movement through the access opening 59 when a tire is transported to the inspection station. The x-ray tube head support assembly 102 has been illustrated and described as horizontally adjustable in two planes as well as being horizontally adjustable about the axis of the hinge 128; however, it is pointed out that once the x-ray tube head position has been adjusted as desired the tube head assembly remains in position during operation of the system 10.

The Imaging System

The x-ray imaging system 16 includes an imaging unit 150 and an imaging unit support structure 152 which is operable to move the imaging unit 150 about a vertical axis or center of movement 153 which extends approximately tangentially to the circular torus centerline of the tire T. The imaging unit 150 can be of any suitable or conventional construction and in the illustrated embodiment of the invention the imaging unit is a "DELCALIX" unit constructed by Oude de Delft a company of Holland. Since imaging units of the type illustrated are conventional the unit 150 is only briefly described. The unit 150 comprises a fluorescent screen member 154 which is effective to fluoresce, or produce visible light, in response impingement of x-rays on it. The intensity of the light produced is a function of the intensity of the impinging x-radiation. Thus the fluorescent screen member produces a visible light image of the x-ray transparency of the tire T. The visible light image on the screen member 154 is directed through a mirror system to an electronic light intensification tube which amplifies the light intensity of the image and directs the amplified image to a T.V. camera 156 through an optical coupling. The mirror system, image intensifier tube and optical coupling are internal to the unit and are not shown. The output for the T.V. camera is transmitted to the T.V. monitor at the operator's station.

The imaging unit support structure 152 comprises a support beam 160 supported at one end by a fixed construction 162 for enabling movement of the support beam 160 about the axis 153. The opposite end of the support beam 160 is supported by a wheel assembly 166 which travels along a semicircular runway 168 on the floor. A drive motor, not shown, moves the support beam 160 about the axis 153 by transmitting drive to the wheels of the assembly 166.

A support body 170 is mounted on the beam 160 and includes a suitable motor, not shown, which is effective to drive the support body 170 along the beam 160 radially toward and away from the axis 153. A vertical arm 174 extends upwardly from the support body and carries a yoke 175 at its projecting end. The yoke 175 is connected to the imaging unit 150 by trunions 176 which enable pivotal adjustment of the unit 150 about the axis of the trunions 176 so that the fluorescent screen 154 can be angulated relative to the inspection station as desired. The fluorescent screen member 154 is angulated upwardly when over-the-horizon scanning is performed.

The axis 153 about which the imaging unit 150 moves is vertical and is substantially tangent to the circular torus centerline of all of the tires within the size range handled by the system 10. Accordingly, the axis 153 need not be shifted relative to the tire to compensate for differences in tire size. This feature of the system 10 enables imaging of all parts of the tire T by x-rays which pass substantially normal to the wall of the tire from bead rim to bead rim. The recesses 59, 59' in the support members 54, 54' and the absence of components projecting from the sides of the support assemblies 32, 34 enable the imaging unit 150 to be moved through an angle of greater than 180° about the axis 153 without interference between the imaging unit and the manipulator assemblies. The recesses 59, 59' permit the x-ray beam to pass through the planes of the members 54 without substantial reduction in the x-ray beam strength. Improved imaging of the tire bead rims and adjacent tire side wall portions is thus provided for without requiring special adjustments of the focal spot location and/or the imaging system position in order to do so.

OPERATION

A cycle of the system 10 is illustrated by FIGS. 6–13 of the drawings which schematically show the various components of the system 10 as they cooperate during the cycle. Referring now to FIG. 6, the assemblies 32, 34 are shown at the loading station with the conveyor system 20 extending between and delivering a tire T to the assemblies 32, 34. The assemblies 32, 34 are spaced apart to enable the tire T to move between them and when the tire T is properly positioned with respect to the manipulator assemblies, the assembly 34 moves toward the assembly 32 so that the stub shafts on each assembly extend into the tire hub. The tire T is then supported by the shafts 76, 80 and 76', 80' of the respective assemblies. The conveyor 20 is then withdrawn from between the assemblies 32, 34.

When the tire is supported by the assemblies 32, 34, the assemblies are moved by the drive unit 36 to transport the tire T to the inspection station the x-ray tube head assembly 130 as is illustrated in FIGS. 7 and 8. The x-ray tube head assembly is supported in alignment with the recess 59 between the arms 56, 58 of the assembly 32 so that as the assemblies 32, 34 move to the inspection position the x-ray tube head assembly 130 moves through the recess 59 in the assembly 32 and into the tire hub. The x-ray tube head assembly thus moves relative to the tire through the bead rim opening in the tire.

At this juncture the rams 86, 88 and 86',88' of the respective assemblies operate to shift the tire relative to the x-ray tube head assembly so that the x-ray tube head assembly and tire move relative to each other radially and the focal spot 17 defined by the x-ray tube head assembly moves to a location within or adjacent the torus of the tire supported by the assemblies 32, 34 (see FIG. 9).

The assembly 34 is then moved away from the assembly 32 to spread the bead rims of the tire T somewhat so that the circumferential section of the tire adjacent the focal spot approximates a semicircle so that the x-ray beams can pass through a tire wall about the focal spot 17 substantially normal to the tire wall. This state of the operation is illustrated in FIG. 10.

The x-ray tube is then energized to produce the beam of x-rays and the tire is rotated to pass the tire wall through the x-ray beam. The x-ray beam is scanned about the focal spot 17 as the tire rotates and the imaging unit 150 is moved about the tire in synchronism with scanning movement of the x-ray beam. The synchronized movement of the x-ray beam and unit 150 can be accomplished by the operator manipulating the machine controls or can be automatically accomplished. Movement of these components can be continuous or stepwise depending on the construction of the controls.

After the tire is completely x-rayed the assembly 34 moves toward the assembly 32 (FIG. 11) and the bead rims are returned to their normal position. The rams 86, 88 and 86', 88' are then operated to relax the tension in the tire bead rims and shift the centerline of the bead rim forwardly relative to the x-ray tube head assembly (see FIG. 12). The imaging unit is moved back to tis initial position with respect to the x-ray tube head as the bead rims are returned to their unspread positions and the rams are operated to relax the bead rim tension.

The assemblies 32, 34 are next moved away from the inspection position to transport the tire to the unloading station as shown in FIG. 13. As the assemblies transport the tire away from the inspection station the x-ray tube head assembly 130 is withdrawn from the tire without interference between any part of the x-ray tube head assembly and the tire bead rims.

When the assemblies 32, 34 reach the unloading station the conveyor 20 is inserted between the assemblies to support the tire T. THe assembly 34 is then moved away from the assembly 32 so that the tire T is free to move from between the assemblies rearwardly from the system 10. The assemblies 32, 34 remain in their spaced apart condition until a succeeding tire is delivered between them to start the next inspection cycle.

The new system 10 is also particularly effective in providing for x-ray inspection of wide tread or green tires without requiring a high degree of operator skill in adjusting the relative positions of the x-ray beam and the imaging unit. When inspecting a wide tread tire, for example, one beam rim and side wall are inspected by rotating the imaging unit 150 from one extreme position adjacent the side wall and bead rim to the position shown in FIG. 1. During this motion the x-ray beam is swept about the focal spot and the imaging unit 150 is moved about the axis 153 so that the x-ray beam remains aligned with the image screen member 154 as the tire is rotated. When the imaging unit 150 reaches a position illustrated in FIG. 1 the x-ray beam is directed substantially radially through the tread region of the tire at one end of the cylindrical tread region.

At this juncture the movement of the x-ray beam and the imaging unit 150 are terminated and the assemblies 32, 34 are simultaneously shifted along the base 30 at a relatively slow speed so that the tread region of the rotating tire is transported between the x-ray tube and the imaging unit 105. This enables x-ray inspection of the complete cylindrical tread region without adjusting the angulation of the x-ray beam and without adjusting the position of the imaging unit 150. When the assemblies 32, 34 have been moved to a position in which the cylindrical tread region of the tire has been inspected, the x-ray beam angle and the imaging unit 150 are again shifted in synchronism with each other about the sidewall and bead rim region of the tire to complete the x-ray inspection of the tire.

The inspection of green tires is substantially the same as described with respect to the wide tread tires except that in many cases the green tires are substantially cylindrical from bead rim to bead rim and may not require manipulation of the x-ray beam and imaging unit in the vicinity of the bead rims.

Inspection of a number of such tires can be automatically accomplished by providing limit switches (not shown) which are movably positioned on the base 30. Such switches are actuated by the carriages 50, 50', or the plates 54, 54' to define the limits of movement of the assemblies 32, 34 as they axially shift the tire relative to the x-ray tube bead and the imaging unit.

While a single embodiment of the present invention has been illustrated and described in detail, the invention is not to be considered limited to the precise construction shown. Various adaptations, modifications and uses of the invention may occur to those skilled in the art to which the invention pertains and the intention is to cover all such adaptations, modifications and uses which come within the scope of the appended claims.

What is claimed is:

1. A tire inspection system comprising:
   a. first and second tire engaging assemblies disposed at opposite sides of a tire and engageable with tire bead rims, respectively;
   b. means for rotating a tire engaged by said assemblies about its centerline;
   c. radiation source means defining a location from which penetrative radiation is emitted for penetrating a tire wall;
   d. source support means for supporting said radiation source means between said first and second tire engaging assemblies and constraining said source against movement transverse to the direction of extent of the tire centerline;
   e. first actuator means for enabling relative movement of said tire engaging assemblies away from each other to enable spreading of the tire bead rims axially apart;
   f. second actuator means for shifting a supported tire in a direction transverse to the tire centerline to an inspection position wherein said location is disposed within or adjacent a circumferential section of a torus defined by said tire; and,
   g. radiation detection means for producing inspection information concerning the tire disposed exteriorly of said circumferential section of the tire torus.

2. A tire inspection system as claimed in claim 1 wherein said radiation detection means comprises a radiation imaging unit and imaging unit support means for moving said imaging unit about an axis of rotation which extends substantially tangent to a generally circular centerline of a torus defined by a tire at said inspection position.

3. A tire inspection system as claimed in claim 1 further including tire conveyor means for feeding tires one at a time to said system, said tire engaging assemblies alignable with said conveyor means and said first actuator means effective to move said assemblies relatively away from each other to enable a tire to be positioned between them and relatively toward each other to engage a tire therebetween.

4. A tire inspection system as claimed in claim 1 wherein at least one of said tire engaging assemblies comprises at least one tire engaging member extending into the tire hub for engagement with a tire bead rim.

5. A tire inspection system as claimed in claim 1 wherein each of said assemblies comprises at least a pair of tire engaging members projecting therefrom axially toward the other assembly for insertion in a tire hub, said second actuator means comprising at least first and second actuators associated with said first and second assemblies, respectively, for relatively moving said tire engaging members of the respective assemblies toward and away from each other in a direction transverse to the centerline of a tire engaged between said assemblies, said first and second actuators effective to shift a tire to the inspection position when said tire engaging members are moved relatively apart.

6. A tire inspection system as claimed in claim 1 wherein said radiation source support means comprises a stationary support member for maintaining said radiation source means at a predetermined position during operation of said first and second actuator means.

7. A tire inspection system as claimed in claim 1 further comprising a support frame for said first and second tire engaging assemblies, said first actuator means comprising a drive unit between said support frame and said assemblies for effecting relative movement between said assemblies along said support frame towards and away from each other.

8. A tire inspection system as claimed in claim 7 wherein said drive unit further comprises motor means for simultaneously moving said assemblies as a unit relative to said support frame.

9. A tire inspection system as claimed in claim 8 further comprising tire conveyor means aligned with said support frame to define at least a tire loading station, said radiation source means positioned with respect to said frame to define an inspection station, said loading station spaced along said frame from said inspection station and said drive unit operable to move said assemblies simultaneously between said loading station and said inspection station to transport a tire therebetween.

10. A system as claimed in claim 1 wherein one of said first and second actuator means comprises a drive unit including motor means and a chain drive.

11. A tire inspection system for providing radiation transparency inspection information concerning the construction of tires having various bead rim diameters within a predetermined range comprising:
   a. first and second tire engaging means respectively engageable with the tire sidewalls on opposite axial sides, respectively. of a tire;
   b. radiation source means defining a location from which tire penetrating radiation emanates;
   c. first actuating means for effecting relative movement of said source means and said first and second tire engaging means in a direction parallel to the centerline of a tire engaged thereby to effect insertion of said source means between said first and second tire engaging means to a location within the bead rim diameter of the tire;
   d. second actuating means associated with at least one of said tire engaging means for shifting the tire in a plane transverse to the tire centerline, the tire being moved from a radiation source insertion position to an inspection position wherein said radiation source location is within or adjacent a circumferential section of a torus defined by the tire; and,
   e. radiation detection means disposed outside of the circumferential section of the tire torus.
   f. said radiation detection means comprising a radiation detector unit and support means for moving said radiation detector unit relative to a tire about a fixed axis of rotation extending approximately tangent to a circular centerline of the tire torus when the tire is in said inspection position.

12. A system as claimed in claim 11 wherein said first and second tire engaging means each comprise a carriage movable in a direction generally parallel to the direction of extent of the tire centerline, said carriages each moved in said direction by said first actuating means.

13. A system as claimed in claim 11 further comprising third actuating means for enabling movement of said first and second tire engaging means relatively toward and away from each other.

14. A system as claimed in claim 11 wherein one of said tire engaging means defines an access opening aligned with the hub of a tire engaged by said one tire engaging means, and further comprising a radiation source means support member extending through said access opening for supporting the radiation source means within the tire hub and at said inspection position.

15. A system as claimed in claim 11 wherein said radiation detector means comprises a detector unit rotatable about an axis, and said second actuating means is effective to shift a tire to a location at which the circular centerline of the tire torus is disposed in substantially tangent relationship with the axis of rotation of said detector unit and to maintain the tire at said location during inspection, and further including means for rotating the tire generally about its axial centerline.

16. A method of inspecting tires comprising:
   a. engaging the tire sidewalls on opposite axial sides of a tire;
   b. relatively moving the tire and a radiation source in a direction generally parallel to the tire centerline to effect insertion of the radiation source within the tire bead rim diameter;
   c. shifting the tire in a direction generally transverse to the tire centerline to move a circumferential section of a generally circular torus defined by the tire at least adjacent the radiation source;
   d. producing penetrative radiation emanating from a location defined by said radiation source and disposed within or adjacent the torus defined by the tire;
   e. directing the radiation from said location through the adjacent tire wall;
   f. rotating the tire about its centerline;
   g. detecting the intensity of radiation which has passed through the tire wall; and,
   h. producing inspection information concerning the tire by use of the detected radiation.

17. The method claimed in claim 16 wherein detecting the intensity of radiation comprises moving a radiation detector about an axis which extends substantially tangent to the circular centerline of the tire torus and at least close to the radiation source location.

18. The method claimed in claim 17 wherein shifting the tire comprises moving the circular centerline of the tire torus to a position wherein the axis of rotation of the radiation detector extends substantially tangent to the torus centerline.

19. The method claimed in claim 16 further including exerting tire sidewall separating forces on the tire to spread the tire beam rims apart while directing radiation through the tire wall.

20. The method claimed in claim 16 wherein engaging the tire sidewalls on opposite axial sides of the tire comprises stationing manipulator assemblies on opposite axial sides of the tire and further including separating said assemblies, delivering a tire to the space between the assemblies and relatively moving the assemblies toward each other to engage and support the delivered tire therebetween.

21. The method claimed in claim 20 wherein relatively moving the tire and the radiation source comprises moving the radiation source relative to an access opening in one of the assemblies whereby the radiation source is inserted into the hub of the tire.

22. Tire inspection apparatus comprising:
   a. first and second tire supporting means disposed on opposite axial sides of a tire;

b. said tire supporting means comprising tire engaging members for supporting a tire for rotation about its centerline;
c. radiation source means operable to emit electromagnetic radiation of sufficient energy to pass through a tire wall from a focal spot defined by said radiation means;
d. first positioning means for positioning said source means between said first and second tire supporting means within the tire bead rim periphery by moving said first and second tire supporting means relative to said source means in a direction generally parallel to the tire centerline;
e. second positioning means for moving said tire engaging members in a direction transverse to the tire centerline so that a circumferential section of a tire engaged by said tire engaging members moves towards said source means to an inspection position wherein said focal spot is located adjacent the tire bead rim periphery of said circumferential section of said tire;
f. radiation defection means supported in a position wherein radiation from said focal spot passes through the circumferential section of a tire adjacent the location and impinges on said detection means; and,
g. means for rotating a tire at the inspection position generally about its centerline.

23. A tire inspection system comprising:
a. first and second tire engaging assemblies engageable with tire sidewalls on opposite sides of a tire, respectively;
b. support frame means for said tire engaging assemblies;
c. a tire loading station at which tires are moved into and out of engagement with said tire engaging assemblies;
d. a tire inspection station spaced from said tire loading station relative to said frame means and defined in part by a radiation source means and a radiation detector means, said source means defining a source element wor emitting tire penetrating radiation and said detector means defining a detector element for detecting radiation emitted by said source element;
e. actuator means for said tire engaging assemblies comprising;
  i. an actuator operable to move said assemblies relatively towards and away from each other at said tire loading station, said assemblies movable relatively away from each other to enable movement of a tire into and away from a position between said assemblies and said assemblies movable relatively towards each other for engaging a tire therebetween; and,
  ii. a second actuator for moving said assemblies as a unit relative to said frame means between said tire loading station and said tire inspection station;
f. first support structure for one of said elements, said first support structure supporting said one element at said inspection station in a position wherein said one element is disposed radially within a tire engaged by said assemblies at said tire inspection station; and,
g. second support structure for the other of said elements, said second support structure supporting said other element outside of the tire at the tire inspection station.

24. The system claimed in claim 23 wherein said first and second tire engaging assemblies each comprises members constructed to extend into the hub of a tire between said assemblies and to engage interior portions of the tire sidewalls, said first actuator effective to relatively move said assemblies to effect axial spreading of the sidewalls of a tire engaged by said assemblies.

25. The system claimed in claim 23 wherein said first and second tire engaging assemblies each comprises first and second members constructed to extend into the hub of a tire between said assemblies and to engage at least portions of the tire sidewall, and further including second actuator means for moving said first and second members of each assembly relative to each other in a direction transverse to the direction of extent of the axial centerline of a tire engaged thereby to shift said tire in a direction transverse to the direction of extent of the axial tire centerline.

* * * * *

UNITED STATES PATENT AND TRADEMARK OFFICE
CERTIFICATE OF CORRECTION

PATENT NO. : 3,843,888
DATED : October 22, 1974
INVENTOR(S) : Richard L.T. Fox

It is certified that error appears in the above–identified patent and that said Letters Patent are hereby corrected as shown below:

Column 2, line 10 "minipulators" should be --manipulators--;

Column 4, line 6, after "assemblies" insert --within the bead rim diameter of the tire. The manipulator assemblies--;

Column 10, line 45, "the" should be --that--;

Column 12, line 17, after "station" insert --horizontally relative to the--;

Column 12, line 61, "tis" should be --its--;

Column 17, line 42, "wor" should be --for--.

Signed and Sealed this fourth Day of November 1975

[SEAL]

Attest:

RUTH C. MASON
Attesting Officer

C. MARSHALL DANN
Commissioner of Patents and Trademarks